United States Patent [19]

Kaizaki et al.

[11] Patent Number: 4,636,863
[45] Date of Patent: Jan. 13, 1987

[54] NOISE REDUCTION CIRCUIT

[75] Inventors: Kazuhiro Kaizaki, Yokohama; Sadao Kubota, Yokohama; Hiroshi Harada, Yokohama; Shigeo Matsuura, Chigasaki, all of Japan

[73] Assignee: Hitachi, Ltd., Tokyo, Japan

[21] Appl. No.: 776,876

[22] Filed: Sep. 17, 1985

[30] Foreign Application Priority Data

Sep. 21, 1984 [JP] Japan .............................. 59-196648

[51] Int. Cl.$^4$ .............................................. H04N 5/21
[52] U.S. Cl. ...................................... 358/167; 358/36
[58] Field of Search ................. 358/167, 36, 163, 336, 358/340, 905

[56] References Cited

U.S. PATENT DOCUMENTS 4,058,836 11/1977 Drewery .............................. 358/167
4,296,436 10/1981 Achiha ................................ 358/167
4,476,491 10/1984 Murata ............................... 358/167
4,539,594 9/1985 Illetschko .............................. 358/36

Primary Examiner—Tommy P. Chin
Attorney, Agent, or Firm—Antonelli, Terry & Wands

[57] ABSTRACT

A noise reduction circuit for reducing noise in video signal comprises delay circuits for delaying an output video signal for delay time 2S and H−S (H denotes one horizontal scanning period and S denotes a half of one period of the color subcarrier), an average circuit for averaging the outputs of the delay circuits, a subtraction circuit for subtracting the output of the average circuit from an input video signal, an attenuation circuit for attenuating the output of the subtraction circuit, an addition circuit for adding the output of the attenuation circuit to the input video signal, and an edge detection circuit for detecting the edge of pattern in the input video signal. The attenuation factor of the attenuation circuit is set into zero when the edge of pattern is detected.

3 Claims, 9 Drawing Figures

NOISE REDUCTION CIRCUIT

BACKGROUND OF THE INVENTION

The present invention relates to a circuit for reducing the noise contained in a video signal.

Up to this time, circuits for reducing noises by smoothing processings which utilize the property of strong line correlation of the video signals are known. However, as it is described in the official gazette of Japanese Patent Application Laid-open No. 211885/1982, if much more improvement in the signal-to-noise ratio is desired, then the pictures displayed on a monitor screen are grown indistinct remarkably and if the signals are processed utilizing only the line correlation, the components having line correlations among noises are emphasized and as a result, the noise generating disturbance in the vertical line in the displayed picture are remarkable. As a result, the improvements of the quality of the displayed picture can not be attained.

SUMMARY OF THE INVENTION

An object of the present invention is to provide a noise reduction circuit for reducing the noise contained in video signals with suppressing the deterioration of the resolution as small as possible.

The above object is accomplished according to the present invention by providing a noise reduction circuit which comprises a plurality of delay circuits for delaying an output video signal for different delay times respectively, an average circuit for averaging the outputs of the delay circuits, a subtraction circuit for subtracting the output of the average circuit from an input video signal, an attenuation circuit for attenuating the output of subtraction circuit, an addition circuit for adding the output of the attenuation circuit to the input video signal, and an edge detection circuit for detecting the existence of the edge of a pattern in the input video signal, the attenuation factor of the attenuation circuit being controlled by the output of the edge detection circuit.

DETAILED DESCRIPTION OF THE PREFERRED EMBODIMENT

A detailed description of the embodiments will be presented in the following by referring to the figures.

Figure 1:
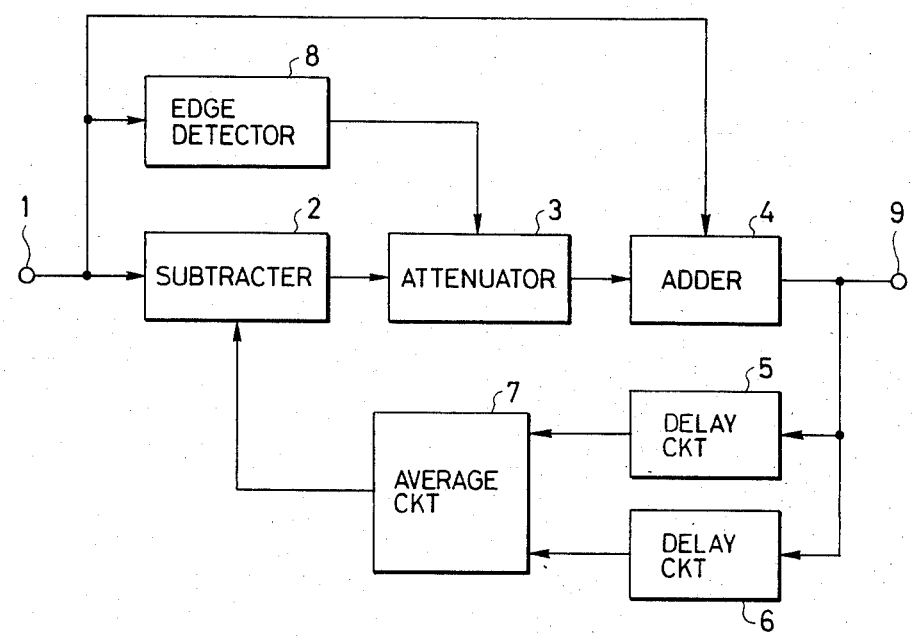
FIG. 1 is a block diagram of a noise reduction circuit according to one embodiment of the present invention.

FIG. 1 shows the block diagram of one embodiment of the present invention. In FIG. 1, reference numeral 1 denotes an input terminal of video signal, 2 denotes a subtraction circuit, 3 denotes an attenuation circuit, 4 denotes an addition circuit, 5 and 6 denote delay circuits respectively, 7 denotes an average circuit, 8 denotes an edge detection circuit and 9 denotes an output terminal of the video signal.

Figure 2:
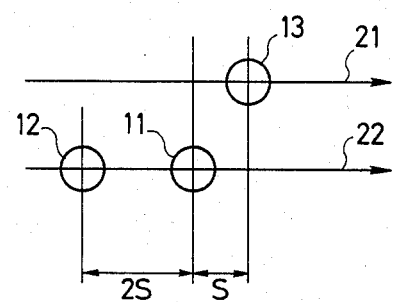
FIG. 2, FIG. 4 and FIG. 5 are schematic illustrations for showing the positional relations of video signals in the picture.

FIG. 2 shows the positional relation in the picture between the video signal 11 taken from the input terminal of the video signal 1 and the past video signal 12 for the time 2S past and the past video signal 13 for the time H−S past from the signal 11. H denotes one horizontal scanning period and S designates one half of the one period of the color subcarrier. H is 63.565 $\mu$sec. and S is 0.140 $\mu$sec. in the NTSC system. Reference numerals 21 and 22 denote horizontal scanning lines and the arrow heads of the horizontal scanning lines 21 and 22 illustrate the directions of scan. The past video signal 12 and 13 correspond to the outputs of the delay circuits 5 and 6 shown in FIG. 1 respectively. In this embodiment the signal processing is carried out using the above mentioned three video signal 11, 12 and 13 simultaneously.

In the following, the performance of this embodiment is explained. The average circuit 7 generates the averaged signal of the output video signals 12 and 13 delayed for the time 2S and H−S respectively by the delay circuits 5 and 6. The difference signal between said averaged signal and the input video signal 11 is generated by the subtraction circuit 2. Said difference signal is multiplied by k ($0 \leq k < 1$) in the attenuation circuit 3 according to whether the edge of the pattern picked up into the video signal is detected or not between the input video signal 11 and the 2S past output video signal 12, and between the input video signal 11 and the H−S past output video signal 13. After that the difference signal is added to the input video signal 11 in the addition circuit 4 and the result of addition is taken out as the noise reduced video signal from the video signal output terminal 9. The above mentioned output video signal is also given to delay circuits 5 and 6 and the same performance mentioned above is repeated. Of course, in FIG. 2, the above mentioned output video signal is at the same position as the above mentioned input video signal 11.

In the following, the principle of the noise reduction circuit of this embodiment will be explained. Let x(t) be the input video signal given to the video signal input terminal 1 at the time t and y(t) be the output video signal taken out from the video signal output terminal 9, then equation (1) is satisfied.

$$y(t) = x(t) + k\{\tfrac{1}{2}(y(t-2S) + y(t-H+S)) - x(t)\} \quad (1)$$

(where $0 \leq k < 1$).

In equation (1), y(t−2S) and y(t−H+S) mean the 2S and H−S past output video signals respectively. Let $Z_S$ and $Z_H$ be delay operators delaying for 2S and H−S respectively and by taking the Z transform of both sides of equation (1)

$$Y(z) = (1-k)X(z) + k/2(Y(z)Z_S^{-1} + Y(z)Z_H^{-1}) \quad (2)$$

therefore the transfer function may be described as $$H(z) = \frac{Y(z)}{X(z)} = \frac{1-k}{1 - \frac{k}{2}(Z_S^{-1} + Z_H^{-1})} \quad (3)$$

Although there is a relation between $Z_H$ and $Z_S$ such that $$Z_H = 454 \, Z_S \quad (4)$$

they may be considered to be almost independent mutually. Hence by expanding the right hand side of equation (3)

$$H(z) = \frac{1-k}{1-\frac{k}{2}(Z_S^{-1}+Z_H^{-1})} \quad (5)$$

$$= (1-k) \cdot \left[ \sum_{i=0}^{\infty} \left(\frac{k}{2}\right)^i (Z_S^{-1}+Z_H^{-1})^i \right]$$

$$= (1-k) \cdot \left[ \sum_{i=0}^{\infty} \sum_{j=0}^{i} \binom{i}{j} Z_S^{-j} Z_H^{j-i} \cdot \left(\frac{k}{2}\right)^i \right]$$

may be obtained. In equation (5), since the video signal is described as the summation of the amplitudes of the coefficients of $Z_S^{-j} Z_H^{j-i}$ $$(1-k) \cdot \left[ \sum_{i=0}^{\infty} \sum_{j=0}^{i} \binom{i}{j} \left(\frac{k}{2}\right)^i \right] \quad (6)$$

$$= (1-k) \cdot \sum_{i=0}^{\infty} k^i$$

$$= 1$$

where $$\binom{i}{j} = \frac{i!}{j!(i-j)!} \quad (7)$$

$$\binom{0}{0} = \frac{0!}{0!\,0!} = 1 \quad (8)$$

Now since noise is described as the summation of the power (the squares) of the coefficients of $Z_S^{-j} Z_H^{j-i}$, from equation (5)

$$(1-k)^2 \cdot \left[ \sum_{i=0}^{\infty} \sum_{j=0}^{i} \binom{i}{j}^2 \left(\frac{k}{2}\right)^{2i} \right] \quad (9)$$

$$= (1-k)^2 \cdot \left[ \sum_{i=0}^{\infty} \frac{(2i-1)!!}{2^i \, i!} k^{2i} \right]$$

$$= (1-k)^2 \cdot \frac{1}{\sqrt{1-k^2}}$$

$$= \frac{(1-k)^{3/2}}{(1+k)^{1/2}}$$

where the following relations are used.

$$\left. \begin{array}{l} \sum_{j=0}^{i} \binom{i}{j}^2 = (2i)!/(i!)^2 \\ (2i-1)!! = 1 \cdot 3 \cdot 5 \cdot \ldots \cdot (2i-3) \cdot (2i-1) \\ (2i)!! = 2 \cdot 4 \cdot 6 \cdot \ldots \cdot (2i-2) \cdot 2i \\ (2i)!! = 2^i \cdot i! \\ (2i)! = (2i)!! \cdot (2i-1)!! \\ (-1)! = 0! = 1 \\ (1-x)^{-\frac{1}{2}} = \sum_{i=0}^{\infty} \frac{(2i-1)!!}{2^i \cdot i!} x^i \end{array} \right\} \quad (10)$$

Therefore, by extracting the square root of equation (9), the noise voltage is described, in dB unit, as $$20 \log \left\{ \frac{(1+k)}{(1-k)} \right\}^{\frac{1}{4}} = 5 \log \left\{ \frac{(1+k)}{(1-k)^3} \right\} \quad (11)$$

Since the noise power is 1 and the noise voltage is 0 (dB) in the case that the present invention is not applied, equation (11) represents the improvement factor of the signal-to-noise ratio.

Figure 3:
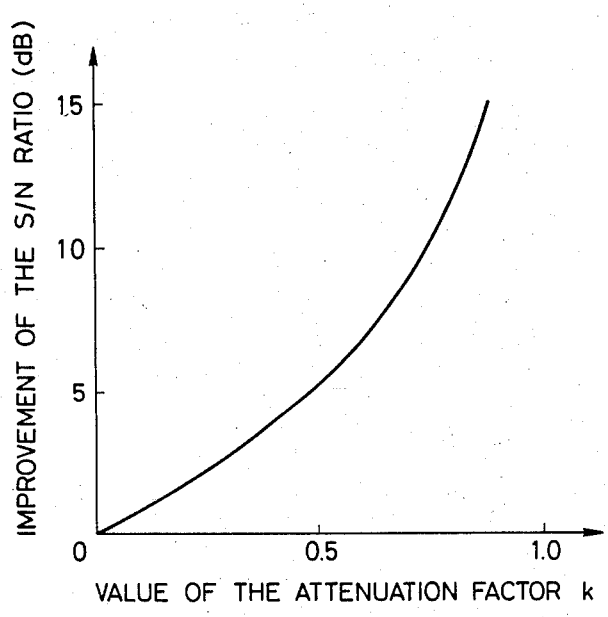
FIG. 3 is a graph showing the characteristics of the improvement of the signal-to-noise ratio against the attenuation factor.

For example, in the case of k=0.7, the improvement of the signal-to-noise ratio becomes to 9.0 dB. FIG. 3 shows the improvement factor of the noise reduction circuit of this embodiment against the value of the attenuation factor k where the abscissa represents the value of k and the ordinate represents the improvement factor of the signal-to-noise ratio calculated by equation (11).

In the noise reduction circuit of this embodiment, as is shown in FIG. 2, because the distance in the picture between the 2S past output video signal 12 and the input video signal 11 is nearly equal to the distance in the picture between the H−S past output video signal 13 and the input video signal 11, it may be considered that the strength of the correlation between the 2S past output video signal 12 and the input video signal 11 are also nearly equal to the strength of the correlation between the H−S past video signal 13 and the input video signal 12. Saving conversely, because the simple mean is taken in the average circuit 7 by presupposing that the strength of the above mentioned correlations are nearly equal, the smoothing operation is not carried out by setting k=0 when the edge of pattern is detected in even either between the 2S past output video signal 12 and the input video signal 11 or between the H−S past output video signal 13 and the input video signal 11, and as a result, it leads to avoid the deterioration in the resulation. And for the case except the above, that is, when the edge is not detected in both between the above mentioned signals, enough reduction of noise is carried out by setting k large enough such as k=0.5−0.9. By means of the above, although large amount of noise is remained in the edge part comparing to the flat part, this noise does not make the viewer to worry because the characteristics of a viewer's vision is deteriorated for the edge part, hence this method is considered to be the way of noise reduction fitting to the characteristics of vision.

Figure 7:
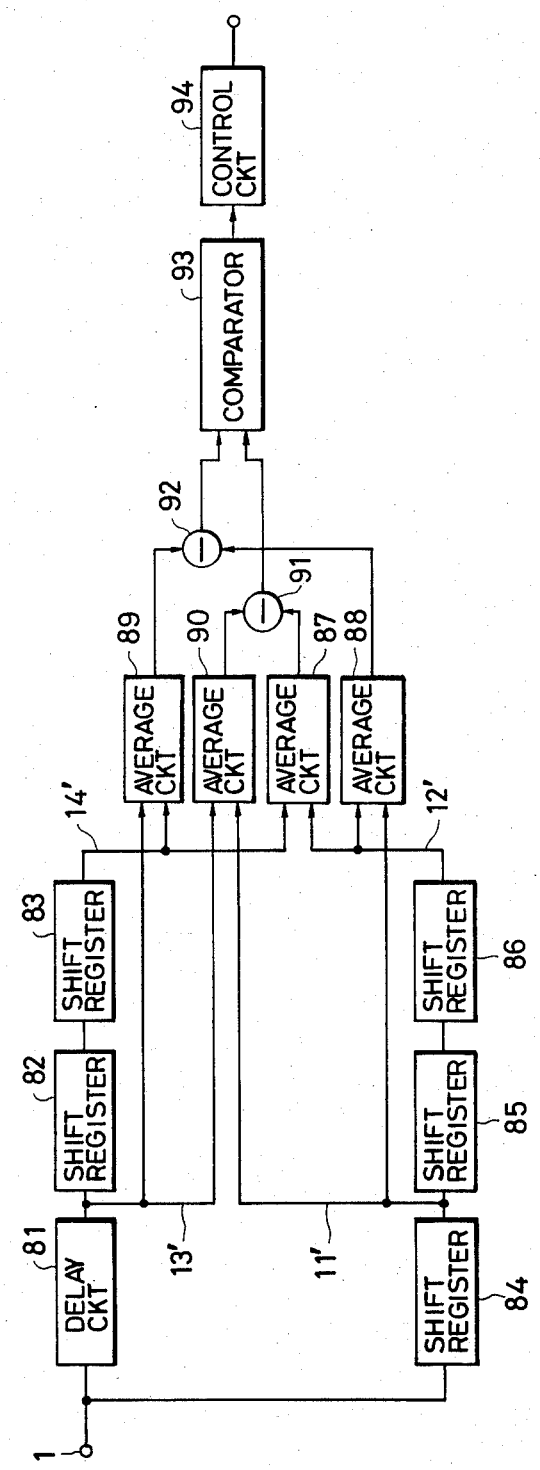
FIG. 7 is a block diagram of an example of edge detection circuit.

In the following, the edge detection circuit 8 will be explained. FIG. 7 is a block diagram showing an example of the edge detection circuit 8. In FIG. 7, reference numeral 1 denotes an input terminal of video signal, 81 denotes a delay circuit for delaying the video signal for 1H (one horizontal scanning period), 82, 83, 84, 85 and 86 denote shift registers each of which delays the video signal for 1S (a half of the one period of the color subcarrier) respectively, 87, 88, 89 and 90 denote average circuits each of which produces the average value of two signals applied thereto respectively, 91 and 92 denote subtraction circuits each of which produces the difference value between two inputted signals respectively, 93 denotes a comparison circuit for comparing two signals applied thereto and delivering the larger one, and 94 denotes a control circuit for generating a control signal to control the attenuation factor k of the attenuation circuit 3 (shown in FIG. 1) in accordance with the output of the comparison circuit 93.

Figure 8:
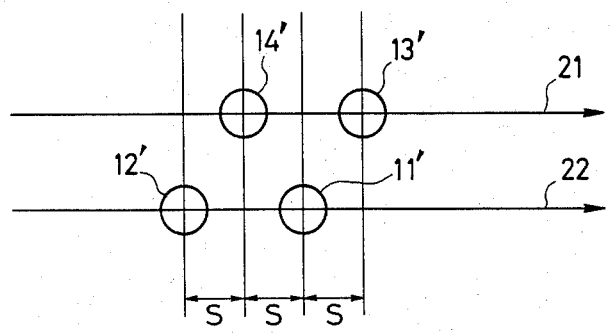
FIG. 8 is a schematic illustration for showing the positional relation of video signals which are used for detecting an edge of pattern.

FIG. 8 shows the positional relation of the video signals on the displayed picture, these video signals being used for detecting the edge of pattern. In FIG. 8, reference numerals 21 and 22 designate horizontal scanning lines. Arrow heads of lines 21 and 22 show the directions of scan. The video signals 12', 13' and 14' are the past input signals for the time 2S, H−S and H+S past from the input video signal 11'.

Let x(t) be the input video signal given to the input terminal 1, then the outputs of the average circuit 87, 88, 89 and 90 are $$\text{Output (87)} = \tfrac{1}{2}\{x(t-2S)+x(t-H-S)\} \quad (12)$$

$$\text{Output (88)} = \tfrac{1}{2}\{x(t-2S)+x(t)\} \quad (13)$$

$$\text{Output (89)} = \tfrac{1}{2}\{x(t-H+S)+x(t-H-S)\} \quad (14)$$

$$\text{Output (90)} = \tfrac{1}{2}\{x(t-H+S)+x(t)\} \quad (15)$$

Therefore, the outputs of the subtraction circuits 91 and 92 are $$\text{Output (91)} = \tfrac{1}{2}\{x(t-2S)+x(t-H-S)\} - \tfrac{1}{2}\{x(t-H+S)+x(t)\} \quad (16)$$

$$\text{Output (92)} = \tfrac{1}{2}\{x(t-2S)+x(t)\} - \tfrac{1}{2}\{x(t-H+S)+x(t-H-S)\} \quad (17)$$

These outputs (91) and (92) represent respectively the variation of video signal in the horizontal and the vertical directions on the picture.

Let u be the output of the comparison circuit 93, then u may be described as $$u = \text{Max}[|\text{output (91)}|, |\text{output (92)}|] \quad (18)$$

and the attenuation factor k may be described as a function of u $$k = f(u) \quad (19)$$

Figure 9:
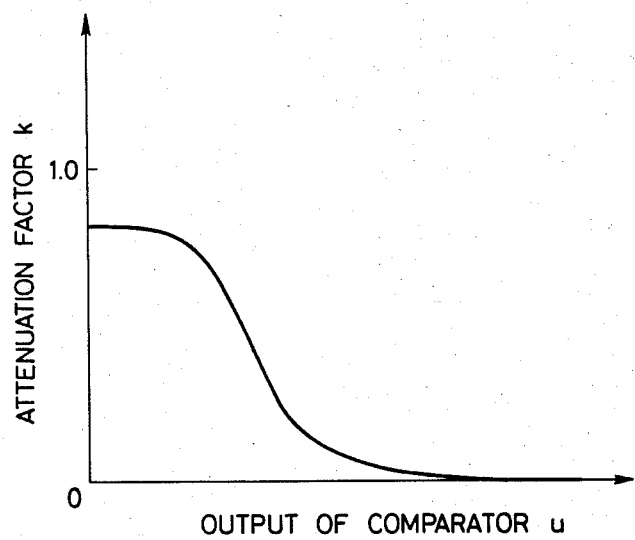
FIG. 9 is a graph showing a relation between an attenuation factor of attenuation circuit and an output of the edge detection circuit.

The functional relation between u and k is illustrated in FIG. 9. When the output u of the comparison circuit 93 is large, that is to say, the edge of pattern is detected between the signals 11' and 12' or between the signals 11' and 13', and attenuation factor k of the attenuation circuit 3 becomes zero. In order to change the attenuation factor k in accordance with the function of u shown in FIG. 9, the control circuit 94 generates, in response to the output u of the comparison circuit 93, a control signal for controlling the attenuation circuit 3.

Since the edge detection circuit has to discriminate the edge of pattern, namely the variation of video signal from the noise in video signal and to pick up only the variation of video signal, it is necessary for the edge detection circuit not to be affected by the noise in video signal. Four average circuits 87, 88, 89 and 90 in the edge detection circuit of FIG. 7 are used for reducing the influence of noise by smoothing the signal and noise.

Figure 4:
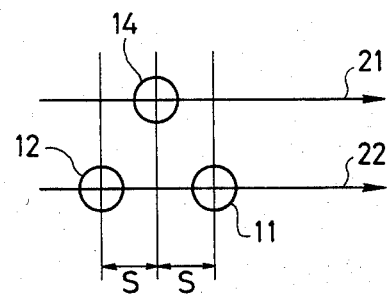
Figure 5:
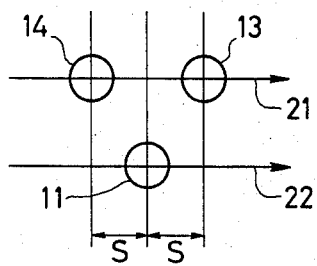

In the present invention, when only luminance signal is processed, video signals for processing can be selected arbitrarily from the neighboring points in the picture, but when the composite signal itself is processed, signals for processing must be selected for the phases of all of the subcarriers for color signals to be same. Therefore, in the embodiment, for the input video signal it is devised not to cancel the color signal by using for signal processing the H−S past output video signal 13 and the 2S past output video signal 12 whose phases of all the subcarriers for color signals are same. At this time, for the input video signal 11, by using the H+S past output video signal 14 shown in FIG. 4 instead of using the H−S past output video signal 13, the composite signal itself can be processed. However, as in this embodiment, the use of the H−S past output video signal 13 leads to be harder to generate noise resulting in bad picture showing such as tailing lines and good results are obtained. This is due to the fact that the better results are obtained as the output video signals used for signal processing of the input video signal 11 have stronger correlation to the input video signal 11 but have weaker correlation between the output video signals used for signal processing of the input video signal (the correlation between the video signal 12 and 13 and the correlation between the video signal 12 and 14). Considering to this fact, it is better for the past output video signal used for the processing of the input video signal 11 to be distant as far as possible in the picture and as is understood by comparing FIG. 2 to FIG. 4 better results are obtained in the case of selecting signals as in the embodiment. Alternatively, as is shown in FIG. 5, for the input video signal 11, although it is possible to use the H−S and the H+S past output video signals 13 and 14 for the signal processing, due to the same reason as mentioned above, better results are obtained by the embodiment and hence it is the optimum to select signals as in this embodiment.

Figure 6:
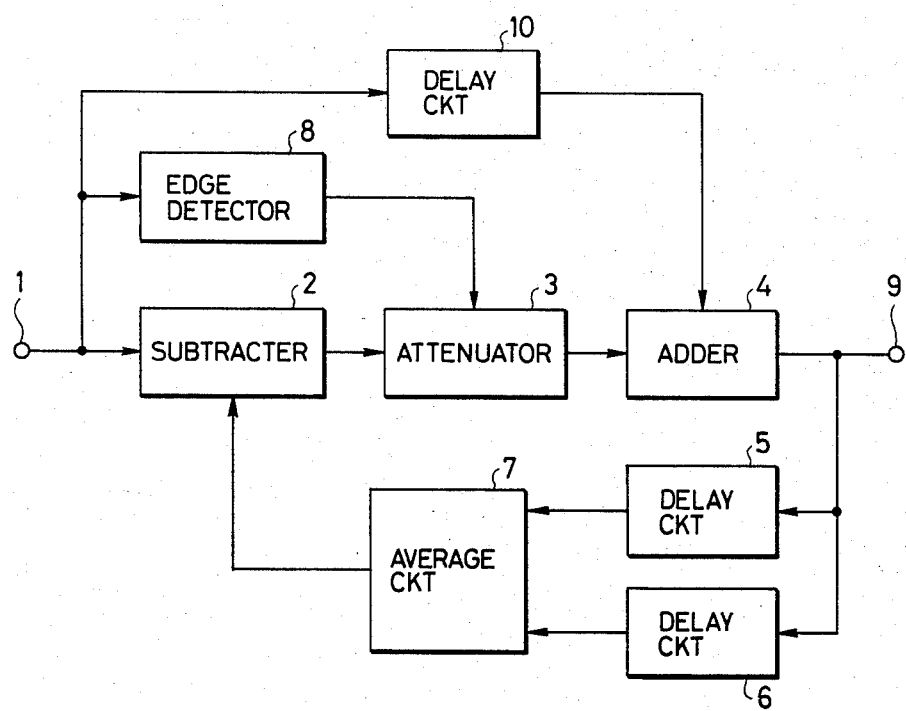
FIG. 6 is a block diagram of a noise reduction circuit according to another embodiment of the present invention considering the time delay in the signal processing.

So far, the explanation is given by assumming that there is no delay during the signal processing. When there is any delay during the signal processing, the above explanation is also entirely valid by adding the delay circuit 10 shown in FIG. 6 and compensating the delay time in the signal processing by the delay circuits 5, 6 and 10.

By the embodiment, in principle enough noise reduction can be attained without the deterioration of the resolution and it is possible to reduce noise to about 15 dB down in the completely flat part of the signal such as the background in the picture by setting, for example, k=0.875.

According to the present invention, since the attenuation factor is controlled adaptively to the edge part and the other flat part, the improvement of the picture quality by more than 6 dB correspondence can be attained with preserving the resolution almost completely and moreover surely reducing noise.

Furthermore, because the signal processing is possible between signals whose phases of the subcarriers for color signnals are all same, and as a result the noise reduction is possible for the composite signal itself by no use of circuits such as a chroma inverter, the total circuit can be constructed in small size and inexpensively.

What is claimed is:

1. A noise reduction circuit comprising:
   a plurality of delay circuits for delaying an output video signal for different delay times respectively;
   an average circuit for averaging the outputs of the delay circuits;
   a subtraction circuit for subtracting the output of the average circuit from an input video signal;
   an attenuation circuit having an attenuation factor for attenuating the output of the subtraction circuit;
   an addition circuit for adding the output of the attenuation circuit to the input video signal; and
   an edge detection circuit for detecting the existence of an edge of a pattern in the input video signal;
   the attenuation factor of the attenuation circuit being controlled by the output of the edge detection circuit.

2. A noise reduction circuit according to claim 1, wherein said plurality of delay circuits is composed of a delay circuit for giving the delay time H−S and a delay circuit for giving the delay time 2S, where H denotes one horizontal scanning period and S denotes a half of one period of the color subcarrier.

3. A noise reduction circuit according to claim 2, wherein the period H is 63.5 μsec. and the period S is 0.14 μsec.

* * * * *